United States Patent Office 3,299,097

Patented Jan. 17, 1967

3,299,097

4-ALKYLHYGRIC ACID HYDRAZIDES

William Schroeder, North Muskegon, Mich., assignor to The Upjohn Company, Kalamazoo, Mich., a corporation of Delaware No Drawing. Filed Mar. 24, 1966, Ser. No. 536,971
5 Claims. (Cl. 260—326.3)

This application is a continuation-in-part of my copending Serial No. 276,568, filed April 29, 1963, now U.S. Patent 3,179,565, and Serial No. 369,602, filed May 22, 1964, now abandoned.

This invention relates to novel compositions of matter and to processes for the preparation thereof, and is particularly directed to the hydrazide of 4-propylhygric, and 4-ethylhygric acids, and to the acid addition salts thereof, and to a process for producing the same.

The novel compounds of this invention can be illustratively represented by the following formula:

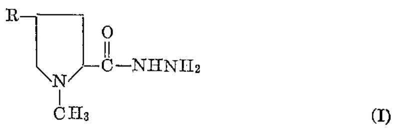

(I)

wherein R is propyl or ethyl. They are obtained as degradation products of the antibiotics lincomycin and lincomycin B which are elaboration products of a lincomycin-producing actinomycete produced according to U.S. Patent 3,086,912.

4-propylhygric acid hydrazide according to the invention is obtained by contacting lincomycin with hydrazine and isolating the resulting 4-propylhygric acid hydrazide. The corresponding 4-ethylhygric acid hydrazide is obtained on hydrazinolysis of lincomycin B. When lincomycin or lincomycin B are refluxed with hydrazine for a relatively short period, say up to about 25 hours or so, the hydrazide obtained is predominately trans-L-hygric acid hydrazide which has the following formula:

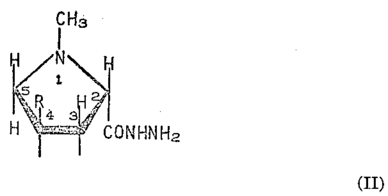

(II)

On prolonged reflux with hydrazine the trans-L-hygric acid hydrazide is partially isomerized to the cis-D-hygric acid hydrazide which has the following formula:

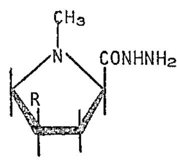

The two diastereoisomers can be separated by conventional procedures, for example, by counter-current distribution or partition chromatography using butanol-water, or methylethylketone-acetone-water as solvent systems.

The other product of the hydrazinolysis is an amino sugar, methyl thiolincosaminide (MTL), which has been found to have the formula:

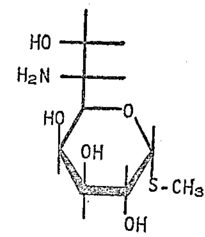

When the excess hydrazine is removed, a pasty mass of MTL crystals is obtained. The non-crystallizing hydrazide can be recovered by washing the crystals with a preferential solvent, i.e., a material that is solvent for the hydrazide and non-solvent for the MTL. Acetonitrile has been found particularly effective for this purpose.

The 4-ethyl and 4-propylhygric acid hydrazides of the invention exist either in the non-protonated (free base) form or the protonated (salt) form depending upon the pH of the environment. They form stable protonates (acid addition salts) by neutralization of the free base with an acid or by metathesis between the protonated form and the anion of an acid. Suitable acids for this purpose include hydrochloric, sulfuric, phosphoric, thiocyanic, fluosilicic, acetic, succinic, citric, lactic, maleic, fumaric, pamoic, cholic, palmitic, mucic, camphoric, glutaric, glycolic, phthalic, tartaric lauric stearic salicylic 3-phenylsalicylic, 5-phenylsalicylic, 3-methyl glutaric orthosulfobenzoic, cyclohexanesulfamic, cyclopentanepropionic, 1,2-cyclohexanedicarboxylic, 4-cyclohexenecarboxylic, octadecenylsuccinic, octenylsuccinic, methanesulfonic, benzenesulfonic, helianthic, Reinecke's, azobenzenesulfonic, octadecylsulfuric, picric, and like acids. These acid addition salts are useful in upgrading the free base. The 4-ethyl and 4-propylhygric acid hydrazides of the invention also form salts with penicillin. These salts have solubility characteristics which cause them to be useful in the isolation atnd purification of penicillins, particularly benzyl penicillin.

The 4-ethyl and 4-propylhygric acid hydrazides of the invention are useful for the resolution of racemic acids. For example, the free bases can be reacted with racemic acids to form diastereoisomeric acid addition salts which can be separated by fractional crystallization into diastereoisomers from which the optically active acids can be regenerated. They also condense with formaldehyde according to U.S. Patents 2,425,320 and 2,606,155, especially when the thiocyanic acid acid addition salt is employed, to form polymers which are useful as pickling inhibitors. Their fluosilicic acid addition salts are useful as mothproofing agents in accordance with U.S. Patents 1,915,334 and 2,075,359. They can be used as Girard type reagents for water-solubilizing keto steroids and other water-insoluble aldehydes or ketones.

On acid hydrolysis they are converted to the corresponding 4-ethyl and 4-propylhygric acids which are useful as antacids and buffers and for resolving diastereoisometric bases. The hydrochlorides are useful for achlorhydria.

The following examples are illustrative of the processes and products of the present invention but are not to be construed as limiting.

EXAMPLE A.—TRANS-4-PROPYL-L-HYGRIC ACID HYDRAZIDE

A solution of 4 g. of lincomycin (U.S. Patent 3,086,-912) in 20 ml. of hydrazine hydrate (99–100%) was refluxed for a period of 21 hours; excess hydrazine hydrate was then removed in vacuo in a nitrogen atmosphere at steam bath temperatures. The residue, a pasty mass of crystals, was cooled, acetonitrile was added and the mixture was stirred until the crystals were suspended. The mixture was then filtered and the filtrate was evaporated to give crude trans-4-propyl-L-hygric acid hydrazide.

EXAMPLE B.—TRANS-4-PROPYL-L-HYGRIC ACID HYDRAZIDE DIPICRATE

A 5 g. sample of crude 4-n-propyl hygric acid hydrazide obtained by the hydrazinolysis of lincomycin was dissolved in water and extracted therefrom with several equal volumes of chloroform. The chloroform extracts were then re-extracted with ¼ volume of water. This procedure served to remove hydrazine and methylthiolincosaminide from the hydrazide. The chloroform solution was then dried over sodium sulfate and evaporated on a rotary evaporator at 50° to leave 2.5 g. of a heavy oily residue. This residue of partially purified hydrazide crystallized on standing overnight but the waxy, low melting material was hygroscopic and resisted crystallization from a number of common solvents. An alcoholic solution when treated with picric acid, however, deposited a crystalline dipricate which could be recrystallized from ethanol to afford an analytical sample.

*Analysis*.—Calcd. for $C_{21}H_{25}N_9O_{15}$: C, 39.19; H, 3.92; N, 1960. Found: C, 39.47; H, 3.71; N, 19.39.

On treatment with 0.1 N sodium hydroxide solution at room temperature followed by extraction with chloroform the free base form was regenerated in purified form.

Following the procedure of the foregoing example but continuing the reflux for a total of about 80 hours, a mixture of trans-4-propyl-L-hygric acid hydrazide and cis-4-propyl-D-hygeric acid hydrazide and the corresponding picrates are obtained.

By substituting lincomycin B in the foregoing for the lincomycin the corresponding 4-ethyl analogs, i.e., trans-4-ethyl-L-hygric acid hydrazide, cis-4-ethyl-D-hydric acid hydrazide and the dipicrate thereof, are obtained.

The following example is illustrative:

EXAMPLE C

Lincomycin B free base (500 mg.) was dissolved in 10 ml. of hydrazine hydrate. The solution was kept at reflux for 24 hours. It was then concentrated to dryness in vacuo. The residue was triturated three times with 10-ml. portions of acetonitrile. Material insoluble in acetonitrile was isolated by filtration and the filtrate treated to recover the trans-4-ethyl-L-hygric acid hydrazide by the procedures of Examples A and B.

*Preparation of lincomycin B*

Twenty-four kiloliters of lincomycin fermentation broth (U.S. Patent 3,086,912) was adjusted to pH 3.0 with concentrated sulfuric acid, and filtered using filter acid. The filtered beer was adjusted to pH 8.0 with 50% aqueous sodium hydroxide solution. The alkaline clear beer was then passed through columns containing Pittsburgh Type CAL, 12–40 mesh granular carbon (109 kilograms). The carbon columns were washed first with water, followed by 99% aqueous acetone. Lincomycin B and lincomycin were eluted from the carbon by using 75% aqueous acetone at 50°. The acetone eluates (8.7 kiloliters) were concentrated under reduced pressure to an aqueous concentrate of 0.3 kl. The aqueous concentrate was adjusted to pH 10.6 with 50% sodium hydroxide solution and extracted with methylene chloride (total volume of 0.4 kl.). The methylene chloride extracts were mixed with water and the mixture was concentrated azeotropically to an aqueous solution (72 liters), which was adjusted to pH 1.0 with concentrated hydrochloric acid. Acetone (0.7 kl.) was added to the acidic aqueous concentrate and the mixture was allowed to stand overnight. Crude crystals of lincomycin and lincomycin B hydrochlorides were isolated by filtration and dried (30.75 kg.).

This material was dissolved in water (32 liters) and mixed with 0.3 kl. of acetone. Lincomycin hydrochloride started precipitating almost immediately. The crystals of lincomycin hydrochloride were isolated by filtration and dried (24.3 kg.). The mother liquors containing lincomycin B hydrochloride and residual lincomycin hydrochloride were concentrated to an aqueous solution (21 liters). One liter of this solution was adjusted to pH 9.5 by using 2 N aqueous sodium hydroxide solution. The alkaline solution was then extracted with methylene chloride. The methylene chloride extract was concentrated to dryness to give 85.0 grams of crude lincomycin B free base which was used as the starting material for the countercurrent distribution described in the next paragraph.

Ten grams of crude lincomycin B free base obtained as described was dissolved in 75 ml. of the lower phase of the solvent system consisting of equal volumes of 1-butanol and water. The pH was adjusted to 4.2 by addition of 1 N aqueous hydrochloric acid. This solution was then mixed with an equal volume of the same solvent and the mixture was transferred in an all-glass Craig counter current distribution apparatus (10 ml./phase). The distribution was stopped when 1000 transfers had been completed. The distribution was then analyzed by the determination of solids and thin-layer chromatography. Two peaks with K values of 0.09 and 0.15 were found. Thin-layer chromatography showed that tube 60–90 contained lincomycin B as the only bioactive material. However, these fractions were found to contain impurities which were removed by the Florisil chromatography described in the next paragraph.

Fractions 60–90 from the countercurrent distribution described were combined and concentrated to an aqueous solution. The pH was adjusted to 10.5 and the solution was freeze-dried to give 900 mg. of colorless amorphous material. This material (800 mg.) was dissolved in 20 ml. of acetone and the solution was added on the top of a 25-mm. (I.D.) column containing 40 grams of Florisil packed in Skellysolve B. The column was then eluted with Skellysolve B-acetone mixtures of increasing acetone content. Lincomycin B was eluted from the column with a mixture of Skellysolve B-acetone in the volume ratio of 10:90. The eluates concentrated to dryness gave 400 mg. of lincomycin B free base obtained as a colorless amorphous material; $[\alpha]_D^{25}$ +153° (c. 0.87, water). The ultraviolet spectrum showed end absorption only. The infrared spectrum showed absorption at the following frequencies: 3340, 2920, 2850, 2780, 1645, 1527, 1457, 1376, 1343, 1325, 1305 1237 1215, 1185, 1158, 1078, 1051, 988, 945, 902, 863, 802, 778, 720, and 692 cm.$^{-1}$.

*Analysis*.—Calcd. for $C_{17}H_{32}N_2O_6S \cdot \frac{1}{2}H_2O$: C, 50.92; H, 8.30; N, 6.99; S, 8.00; O, 25.84; M.W. 401. Found: C, 50.96; H, 8.52; N, 6.94; S, 7.89; O (diff.), 25.69.

Potentiometric titration showed the presence of one titratable group, pKa' 7.68, equivalent weight 406.

I claim:

1. A member of the group consisting of a compound of the formula:

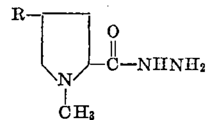

wherein R is selected from the group consisting of ethyl and propyl and the acid addition salts thereof.

2. L-hygric acid hydrazide of claim 1 in which R is trans-4-propyl.

3. L-hygric acid hydrazide of claim 1 in which R is trans-4-ethyl.

4. L-hygric acid hydrazide dipicrate of claim 1 in which R is trans-4-propyl.

5. L-hygric acid hydrazide dipicrate of claim 1 in which R is trans-4-ethyl.

No references cited.

ALEX MAZEL, *Primary Examiner.*

J. TOVAR, *Assisstant Examiner.*